United States Patent
Krohm et al.

[11] Patent Number: 6,024,667
[45] Date of Patent: Feb. 15, 2000

[54] POWER TRAIN WITH AUXILIARY AGGREGATES FOR USE IN A MOTOR VEHICLE

[75] Inventors: Harald Krohm, Bochum; Dirk Neubauer, Nachrodt-Wiblingwerde; Robert Wiench, Recklinghausen, all of Germany

[73] Assignee: AFT Atlas Fahrzeugtechnik GmbH, Werdohl, Germany

[21] Appl. No.: 09/113,994

[22] Filed: Jul. 10, 1998

[30] Foreign Application Priority Data

Jul. 14, 1997 [DE] Germany .......................... 197 30 032

[51] Int. Cl.⁷ .................................................. B60K 41/02
[52] U.S. Cl. .............................. 477/6; 475/210; 475/214; 74/15.63; 74/15.84
[58] Field of Search ......................... 74/661, 15.6, 15.63, 74/15.8, 15.84; 477/2, 3, 5, 6; 475/214, 210

[56] References Cited

U.S. PATENT DOCUMENTS

| | | | |
|---|---|---|---|
| 3,882,950 | 5/1975 | Strohlein | 180/165 |
| 4,131,171 | 12/1978 | Keyes | 180/54.1 |
| 4,252,208 | 2/1981 | Heidemeyer et al. | 180/165 |
| 4,315,439 | 2/1982 | Grachtrup | 74/661 |
| 4,330,742 | 5/1982 | Reimers | 320/14 |
| 4,407,398 | 10/1983 | Fiala | 477/5 |
| 4,411,171 | 10/1983 | Fiala | 74/675 |
| 4,566,279 | 1/1986 | Kronogard et al. | 74/661 X |
| 4,625,823 | 12/1986 | Frank | 180/165 |
| 5,046,991 | 9/1991 | Friedmann | |
| 5,169,365 | 12/1992 | Friedmann | |
| 5,178,238 | 1/1993 | Schaeff | 188/295 |
| 5,217,412 | 6/1993 | Indlekofer et al. | |
| 5,295,915 | 3/1994 | Friedmann | |
| 5,667,448 | 9/1997 | Friedmann | |
| 5,711,730 | 1/1998 | Friedmann et al. | |
| 5,836,151 | 11/1998 | Atanasyan et al. | 60/274 |

FOREIGN PATENT DOCUMENTS

| | | |
|---|---|---|
| 0 269 270 | 6/1988 | European Pat. Off. . |
| 44 44 545 A1 | 6/1995 | Germany . |

Primary Examiner—Charles A. Marmor
Assistant Examiner—Ha Ho
Attorney, Agent, or Firm—Darby & Darby

[57] ABSTRACT

The prime mover of a power train for use in a motor vehicle normally drives a flywheel by way of a first engageable/disengageable clutch, and the flywheel drives the rotary input member of an automated change-speed transmission assembly by way of a second engageable/disengageable clutch. At least one first auxiliary aggregate (such as the pump of a power steering unit) can receive torque directly from the prime mover, and at least one second auxiliary aggregate (such as the compressor of an air conditioning system) can receive torque from the input member of the transmission assembly or from the prime mover. The rotary output member of the transmission assembly can receive torque from a continuously variable transmission which receives torque from the input member by way of a planetary, or from a planetary which receives torque from a continuously variable transmission. The internal gear of the planetary can be arrested by a stationary brake to thus interrupt the transmission of torque to the output member.

25 Claims, 2 Drawing Sheets

POWER TRAIN WITH AUXILIARY AGGREGATES FOR USE IN A MOTOR VEHICLE

BACKGROUND OF THE INVENTION

The invention relates to improvements in power trains for use in motor vehicles. More particularly, the invention relates to improvements in power trains which, in addition to transmitting torque to the wheels of a motor vehicle by way of a suitable transmission assembly, are called upon to transmit torque or power or motion to one or more auxiliary aggregates, e.g., to the pump of a power steering system, to a light generator, to a component part (e.g., a compressor) of an air conditioning system, and/or others.

It is already known to construct the power train in a motor vehicle in such a way that a prime mover (such as an internal combustion engine) transmits torque to an energy storing torque transmitting device (e.g., a flywheel) in response to engagement of a first clutch, and the torque transmitting device can drive the rotary input member of a transmission assembly in response to engagement of a second clutch. Furthermore, the power train is designed to drive at least one first and at least one second auxiliary aggregate. Reference may be had, for example, to published German patent application No. 44 44 545 which discloses a power train for a motor vehicle wherein, as a rule, the auxiliary aggregates are driven directly by the prime mover. In other words, if the prime mover is off (e.g., while a motor vehicle is coasting), the auxiliary aggregate or aggregates is or are invariably idle.

A drawback of such prior proposals is that the operation of an auxiliary aggregate which is not driven at all times while the motor vehicle is in use (or which is idle for extended periods of time or which is idle at inopportune times) is likely to be adversely affected and is likely to operate unsatisfactorily, or to become inoperative, with attendant danger of inconvenience to the occupant or occupants of the motor vehicle. For example, a defective braking force amplifier is likely to endanger the occupant or occupants of a motor vehicle by failing to operate in a desired manner while the combustion engine is turned off or as a result of repeated starting and stoppage.

On the other band, certain auxiliary aggregates are not affected, or not unduly affected, by repeated stoppages and/or by prolonged idleness; in fact, it might even be advisable or useful to maintain such auxiliary aggregates at a standstill for extended intervals of time while the motor vehicle is in use.

OBJECTS OF THE INVENTION

An object of the invention is to provide a power train which can be used in a motor vehicle and includes at least one constituent capable of transmitting torque, power and/or motion to one or more auxiliary aggregates (e.g., to one or more pumps, compressors of other parts of power steering systems, brakes, light generators, air conditioning systems or the like) without any interruptions; with interruptions preparatory to, during or subsequent to certain stages of operation of the motor vehicle; with randomly staggered or regularly recurring interruptions; and/or under certain specific circumstances (e.g., in emergency situations).

Another object of the invention is to provide a power train wherein at least one of two or more auxiliary aggregates can be actuated only by a prime mover, such as an internal combustion engine, an electric motor or a hybrid drive.

A further object of the invention is to provide a novel and improved transmission assembly for use in the above outlined power train.

An additional object of the invention is to provide a power train wherein one or more auxiliary aggregates can remain operative irrespective of the condition of the prime mover.

Still another object of the invention is to provide a power train with drive means for one or more auxiliary aggregates which is more reliable and safer than heretofore known power trains.

A further object of the invention is to provide a relatively simple and inexpensive but reliable power train with one, two or more auxiliary aggregates which is more reliable and more versatile than heretofore known power trains.

Another object of the invention is to provide a motor vehicle which employs the above outlined power train.

An additional object of the invention is to provide the above outlined power train with a plurality of torque transmitting systems, such as clutches, which are installed between a prime mover and a change-speed transmission assembly in a novel and improved way.

Still another object of the invention is to provide a power train wherein the torque transmitting connection between the rotary input and output members of the change-speed transmission assembly can be established, interrupted and/or otherwise regulated in a novel and improved way.

A further object of the invention is to provide novel and improved energy storing means for use in the above outlined power train.

Another object of the invention is to provide a novel and improved driving connection between a transmission assembly and one or more auxiliary aggregates in the power train of a motor vehicle.

An additional object of the invention is to provide a novel and improved method of initiating, interrupting and/or otherwise regulating the operation of one, two or more auxiliary aggregates which receive torque, power or motion from one or more constituents of a power train in a motor vehicle.

Still another object of the invention is to provide a novel method of establishing an operative connection or two or more operative connections between a prime mover and one or more auxiliary aggregates in the power train of a motor vehicle.

A further object of the invention is to provide a novel method of establishing an operative connection or two or more operative connections between a change-speed transmission assembly (such as an automated transmission assembly) and one or more auxiliary aggregates in the power train of a motor vehicle.

Another object of the invention is to provide a novel and improved combination of a continuously variable transmission, a planetary, and one or more brakes in an automated change-speed transmission assembly forming part of a power train in a motor vehicle.

An additional object of the invention is to provide a novel and improved torque transmitting connection between the prime mover and the transmission assembly in the power train of a motor vehicle.

SUMMARY OF THE INVENTION

One feature of the present invention resides in the provision of a power train which can be utilized in a motor vehicle and comprises a prime mover (e.g., an internal combustion engine), energy storing torque transmitting means (such as one or more flywheels), a transmission assembly (e.g., an automated transmission assembly having a rotary input member arranged to receive torque from a rotary output element of the prime mover and a rotary output member arranged to transmit torque to the driven wheels of the motor vehicle, e.g., by way of a suitable differential), an engageable and disengageable first torque transmitting system (such as a friction clutch) arranged to transmit torque between the prime mover and the energy storing means in the engaged condition of such torque transmitting system, an engageable and disengageable second torque transmitting system (such as a friction clutch) arranged to transmit torque between the energy storing means and the input member of the transmission assembly in the engaged condition of such second torque transmitting system, at least one first drivable auxiliary aggregate, a first driving connection between the prime mover and the first auxiliary aggregate, at least one second drivable auxiliary aggregate, and a second driving connection established or adapted to be established between the transmission assembly (particularly the input member of such assembly) and the at least one second auxiliary aggregate.

The first driving connection can be set up to drive the at least one first auxiliary aggregate irrespective of the condition of the first torque transmitting system (between the output element of the prime mover and the energy storing means).

The second driving connection can be arranged to drive the at least one second auxiliary aggregate irrespective of the condition of the second torque transmitting system (between the energy storing means and the input member of the transmission assembly).

The transmission assembly can comprise a starting unit including at least one of (a) a starting clutch, (b) a torque converter, (c) a starting brake, and (d) a forwards-rearwards shifter.

It is also possible to employ a transmission assembly which comprises at least one gear train, such as a planetary. For example, the planetary can include a first component constituting a sun gear, a second component constituting a planet carrier, and a third component constituting an internal gear. One of these components is operatively connected with the input member, another of these components is operatively connected with the output member, and the remaining component is arranged to be blocked by a device which can comprise a clutch or a brake. The one component can constitute the sun gear, the other component can constitute the planet carrier, and the remaining component then constitutes the internal gear.

The planetary further comprises one or more pinions mounted on the planet carrier and meshing with the sun gear as well as with the internal gear.

The transmission assembly can further comprise a continuously variable transmission which connects the other component of the planetary with the output member of the transmission assembly. Alternatively, the continuously variable transmission can be installed to connect the input member of the transmission assembly with the one component of the planetary.

The second driving connection can comprise a freewheel, and the power train can further comprise a third driving connection arranged to operate between the prime mover and the at least one second auxiliary aggregate. Such third driving connection can comprise an engageable and disengageable clutch.

In accordance with one presently preferred embodiment, the first driving connection is arranged to drive the at least one first auxiliary aggregate irrespective of the condition of the first torque transmitting system, and the second driving connection is arranged to drive the at least one second driving aggregate irrespective of the condition of the second torque transmitting system. Such second driving connection can comprise a freewheel, and the third driving connection can be set up to transmit torque between the prime mover and the at least one second auxiliary aggregate. The third driving connection can comprise an engageable and disengageable clutch. In this one presently preferred embodiment, the at least one second auxiliary aggregate can be set up to receive motion from the prime mover by way of the third driving connection in the engaged condition of the clutch and to receive motion from the input member of the transmission assembly by way of the second driving connection in the disengaged condition of such clutch.

At least one of the auxiliary aggregates can include at least one of the following: a light generator, at least a portion (such as a compressor) of an air conditioning unit, at least one pump, at least one portion (e.g., a pump) of a power steering system or unit, at least one braking force amplifier, at least a portion (such as a pump) of an antiblocking system, and at least one fan or blower.

As already mentioned hereinbefore, at least one of the torque transmitting systems can comprise a clutch, e.g., an automated clutch.

The energy storing means can comprise one or more flywheels or an armature of an electric motor.

The prime mover can comprise a combustion engine, an electric motor or a hybrid prime mover (e.g., a combination of a motor (such as an electric motor) and a combustion engine).

Another feature of the invention resides in the provision of a power train which can be utilized in a motor vehicle and comprises a prime mover having a rotary output element, and a transmission assembly. The latter comprises a planetary having a sun gear arranged to receive torque from the output element of the prime mover, a rotary planet carrier serving to transmit torque to a transmission, at least one planet pinion provided on the planet carrier and mating with the sun gear, and a rotary internal gear mating with the at least one planet pinion. The power train further comprises means for selectively interrupting the flow of power from the prime mover to the transmission of the transmission assembly. The interrupting means can comprise a brake which is operable to prevent rotation of the internal gear. The brake is preferably stationary, and the transmission can constitute a continuously variable transmission.

A further feature of the invention resides in the provision of a power train which can be put to use in a motor vehicle and comprises a prime mover having a rotary output element (such as the camshaft or the crankshaft of an internal combustion engine), and a transmission assembly including rotary input and output members, a transmission (such as a continuously variable transmission) arranged to receive torque from the input member, and a planetary having a rotary planet carrier connected with the output member by way of the transmission, at least one planet pinion provided on the planet carrier, and an internal gear mating with the at least one planet pinion. The power train further comprises means for selectively interrupting the flow of power between the output element and the output member. The interupting means can comprise at least one brake for the internal gear, and the brake is preferably a stationary brake. The planetary can further comprise a sun gear which receives torque from the output element of the prime mover and mates with the at least one planet pinion.

The novel features which are considered as characteristic of the invention are set forth in particular in the appended claims. The improved power train itself, however, both as to its construction and the modes of assembling and operating the same, together with numerous additional important features and advantages thereof, will be best understood upon perusal of the following detailed description of certain presently preferred specific embodiments with reference to the accompanying drawings.

DESCRIPTION OF PREFERRED EMBODIMENTS

Figure 1:
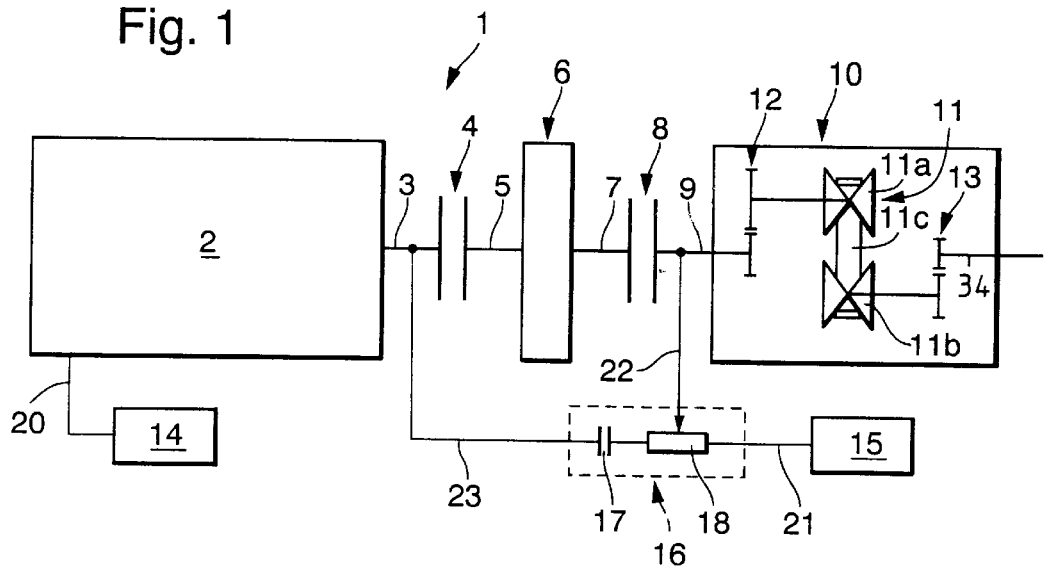
FIG. 1 is a schematic partly plan and partly sectional view of a power train which embodies or controls several auxiliary aggregates and is constructed and assembled in accordance with one embodiment of the invention.
Figure 4:
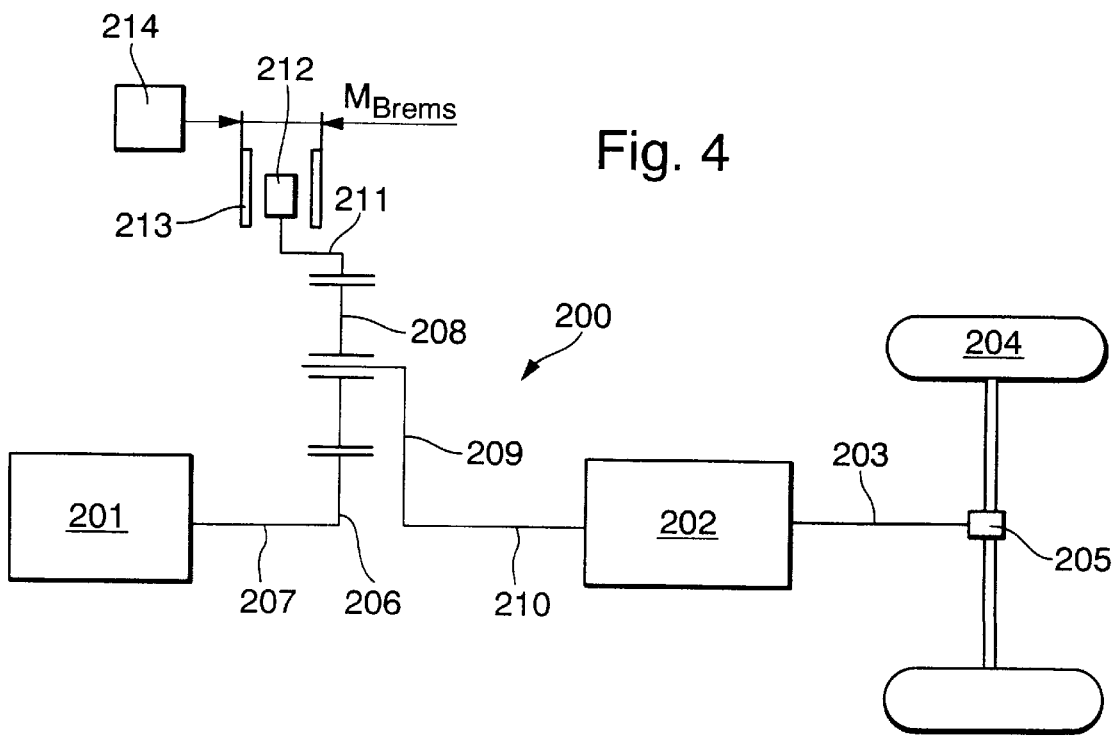
FIG. 4 is a fragmentary schematic partially plan and partially sectional view of a power train with a planetary installed between the output element of the prime mover and the input member of a change-speed transmission assembly.

FIG. 1 shows certain constituents of a novel and improved power train 1 which can be utilized in a motor vehicle to drive the front and/or the rear wheels (two wheels are shown in FIG. 4, as at 204). The power train 1 comprises a suitable prime mover 2 (such as an internal combustion engine, an electric motor, or a hybrid drive including an electric motor and an engine) having a rotary output element 3 (e.g., the crankshaft or the camshaft of an internal combustion engine). The output element 3 can transmit torque to a first engageable and disengageable torque transmitting system 4 (e.g., a clutch and hereinafter called clutch for short) which, in turn, can transmit torque to the input shaft 5 of a torque transmitting energy storing means 6 (e.g., a flywheel and hereinafter called flywheel). The output shaft 7 of the flywheel 6 can transmit torque to a rotary input member 9 of a transmission assembly 10 by way of a second engageable and disengageable torque transmitting system 8 (such as a clutch and hereinafter called clutch for short).

The transmission assembly 10 of FIG. 1 comprises a continuously variable transmission (CVT) 11 having adjustable pulleys 11a, 11b and an endless flexible element 11c trained over the two pulleys. Continuously variable transmissions of such character are disclosed, for example, in U.S. Pat. Nos. 5,046,991, 5,169,365, 5,217,412, 5,295,915, 5,667,448 and 5,711,730. The disclosures of all of these patents are incorporated herein by reference.

The endless flexible element 11c can constitute a standard band, a standard chain or a belt device of the type disclosed, for example, in European patent application No. 0 269 270 of FUJI (published Jan. 6, 1988). The disclosure of this publication (as well as of the previously mentioned German patent application No. 44 44 545) is also incorporated herein by reference.

The CVT 11 can be replaced with a friction wheel transmission or with a friction ring transmission without departing from the spirit of the invention. Furthermore, at least one transmission stage or at least one partial transmission can be installed upstream or downstream of the CVT 11. The transmission stage can constitute a stage having a fixed ratio or a stage which can be shifted into two or more gears.

The transmission assembly 10 can further comprise a starting element (such as a friction clutch, a starting clutch, or a hydrokinetic torque converter with or without a lockup or bypass clutch). The pulley 11b of the CVT 11 transmits torque to a rotary output member 34 which can drive a differential (see the differential 205 in the power train of FIG. 4) for the axle(s) of the front and/or rear wheels of the motor vehicle.

A non-adjustable stage (such as a step-down stage) 12 is connected between the input member 9 of the transmission assembly 10 and the first adjustable pinion 11a of the CVT 11. This stage includes a gearing including a smaller-diameter spur gear driven by the input member 9 and a larger-diameter spur gear meshing with the smaller-diameter spur gear and driving the shaft of the pulley 11a. This simple stage 12 can be replaced with a manually shiftable stage or with an automated stage having a desired number of gear ratios (including, for example, a reverse gear, a neutral gear and two or more forward gears). This might render the CVT 11 unnecessary.

FIG. 1 further shows a step-up gearing 13 between the second pulley 11b of the CVT 11 and the output member 34 of the transmission assembly 10. The gearing 13 can comprise a larger-diameter spur gear on the shaft of the pulley 11b and a smaller-diameter spur gear meshing with the larger-diameter spur gear and connected with the output member 34 of the assembly 10.

At least one first auxiliary aggregate 14 can receive torque, power or motion directly from an outlet or output of the prime mover 2 by way of a driving connection 20. The latter can comprise a chain, a shaft, a gearing or the like. The box which is denoted by the character 14 can represent a single auxiliary aggregate or two or more related (e.g., interconnected) or independent auxiliary aggregates. Each of several (e.g., two) auxiliary aggregates denoted by the character 14 can be connected with the prime mover 2 by the single (common) driving connection 20 or by a discrete driving connection. Such connection or connections is or are operative to transmt torque, power or motion as long as the prime mover 2 is on and irrespective of the condition (engaged, partly engaged or disengaged) of the clutch 4.

FIG. 1 further shows at least one second auxiliary aggregate 15 which can be operated by the input member 9 of the transmission assembly 10 or by the output element 3 of the prime mover 2. The rotary (or otherwise movable) input component 21 of the at least one second auxiliary aggregate 15 (e.g., a light generator) can receive torque, power or motion from a driving connection 22 branching off the input member 9 and connectable with the input component 21 by a shifting or switching unit 16 including a freewheel 18 and an engageable and disengageable clutch 17. When the clutch 17 is engaged, the input component 21 of the at least one second auxiliary aggregate 15 can receive torque, power or motion directly from the output element 3 of the prime mover (by way of the driving connection 23). When the clutch 17 is disengaged, the at least one second aggregate 15 can be operated by the input member 9 (i.e., by the transmission assembly 10) by way of the driving connection 22 and the input component 21. The freewheel 18 becomes active when the clutch 17 is engaged to establish a connection between the parts 23 and 21. Alternatively, the unit 16 can be designed in such a way that the freewheel 18 is inoperative when the clutch 17 is engaged.

When the motor vehicle is coasting, the clutch 4 is or can be disengaged to thus disconnect the prime mover 2 from the transmission assembly 10. This renders it possible to turn off the prime mover 2, e.g., in order to save fuel and to interrupt the emission of combustion products. The clutch 8 is then preferably engaged so that the CVT 11 can accelerate the flywheel 6. The freewheel 18 in the shifting or switching unit 16 enables the driving connection 22 to operate the at least one second auxiliary aggregate 15 until the vehicle comes to a full stop, i.e., when the coasting of the vehicle is interrupted or terminated, or in response to renewed acceleration of the vehicle.

If and when the flywheel 6 reaches a maximum RPM before the vehicle comes to a halt, the clutch 8 can be disengaged to disconnect the flywheel 6 from all other parts of the power train 1 but the at least one second auxiliary aggregate 15 can be operated as long as the input member 9 of the transmission assembly 10 continues to rotate. If the at least one auxiliary aggregate 15 should be operated while the vehicle is at a standstill, the clutch 4 is engaged so that the rotating flywheel 6 can rotate the output element 3 of the prime mover 2 and the driving connection 23 can operate the auxiliary aggregate 15 in response to engagement of the clutch 17. The clutch 8 attends to the shifting and vehicle starting tasks in that it is engaged or disengaged in a controlled manner.

To summarize: The power train 2 of FIG. 1 employs an energy storing means 6 (preferably a flywheel) between two engageable and disengageable clutches 4 and 8. The clutch 8 must be engaged to transmit torque from the rotating flywheel 6 to the input member 9 of the transmission assembly 10, i.e., to the CVT 11. The at least one first auxiliary aggregate 12 is adapted to be operated (via driving connection 20) only when the prime mover 2 is on because it is more or less rigidly connected with the prime mover. On the other hand, the shifting or switching unit 16 renders it possible to operate the at least one second auxiliary aggregate 15 by the prime mover 2 (via driving connection 23 and engaged clutch 17), by the rotating flywheel 6 (via connection 23 in response to engagement of the clutches 4 and 7), or by the rotating input member 9 (via driving connection 22). In other words, the at least one second auxiliary aggregate 15 can be driven by the prime mover 2, by the flywheel 6, or by the vehicle and transmission assembly 10 (during coasting of the vehicle) in dependency on the operating point.

The clutch 4 can serve to transmit torque from the prime mover 2 to the input shaft 5 of the flywheel 6, or from the flywheel 6 to the output element 3 and connection 23. On the other band, the clutch 8 can transmit torque from the output shaft 7 of the flywheel 6 to the input member 9 (and hence to the transmission assembly 10), and to the connection 22.

If the motor vehicle is coasting, the clutch 4 can be disengaged to thus disconnect the prime mover 2 from all constituents of the power train 1 except the at least one first auxiliary aggregate 14, and the prime mover 2 can be turned off so that its output element 3 need not be rotated by the flywheel 6 (i.e., by the transmission assembly 10). This entails (or can entail) considerable savings in fuel and ensures that the emission of combustion products is interrupted while the vehicle is in motion (coasting).

The at least one first auxiliary aggregate 14 can constitute that aggregate or one of those aggregates which is not or are not needed when the vehicle is coasting. In other words, the operation and/or manipulation and/or safety of the motor vehicle is not or need not be affected when the vehicle is coasting and the at least one auxiliary aggregate 14 is not in operation.

The CVT 11 of the transmission assembly 10 renders it possible to continuously accelerate the flywheel 6 while the vehicle is coasting and the clutch 8 is engaged. The unit 16 reders it possible to operate the at least one second auxiliary aggregate 15 as long as the vehicle is coasting as well as in response to renewed acceleation. When the RPM of the flywheel 6 rises to a maximum value before the vehicle comes to a halt, the flywheel 6 can be disconnected from the transmission assembly 10 in response to disengagement of the clutch 8 while the input member 9 continues to operate the at least one second auxiliary aggregate 15 via connection 22 and system or unit 16. If the at least one second auxiliary aggregate 15 is to remain or to become operative while the vehicle is at a standstill, the clutch 4 is engaged so that the rotary flywheel 6 drives the output element 3 and the connection 23 which latter operates the at least one second auxiliary aggregate 15 as long as the clutch 17 remains engaged and the flywheel 6 continues to rotate. The clutch 8 serves as a sole means for carrying out the aforementioned starting and shifting operations.

The transmission assembly 10 can further comprise a starting unit including at least one of: (a) a starting clutch, (b) a torque converter, (c) a starting brake, and (d) a forwards-rearwards shifter.

Figure 2:
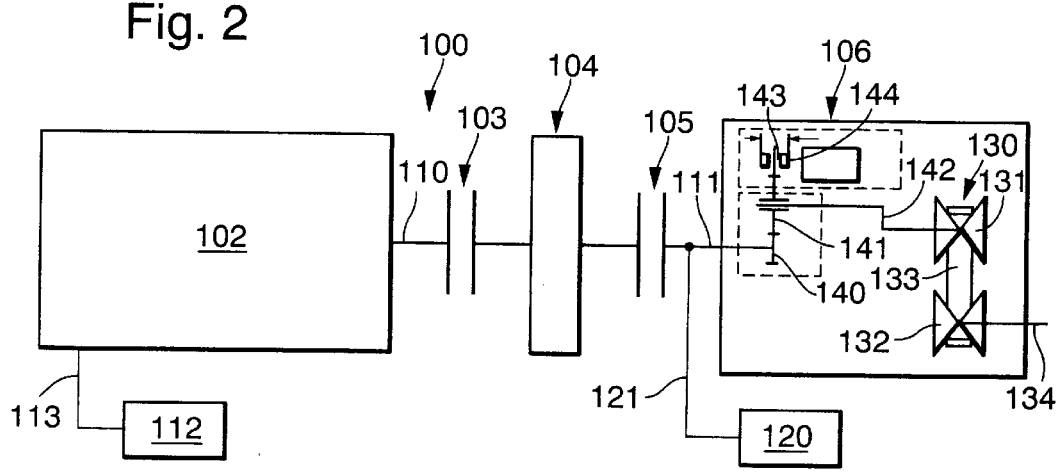
FIG. 2 is a similar view of a power train which constitutes a first modification of the power train of FIG. 1.

FIG. 2 shows a modified power train 100 which comprises a prime mover 102 having a rotary output element 110 adapted to be coupled to an energy storing flywheel 104 in response to engagement of a first engageable and disengageable torque transmitting system 103 (such as a clutch). Transmission of torque between the flywheel 104 and the rotary input member 111 of a transmission assembly 106 can take place in response to engagement of a second engageable and disengageable torque transmitting system (clutch) 105.

At least one first auxiliary aggregate 113 can receive motion from the prime mover 102 by way of a first driving connection 113. At least one second auxiliary aggregate 120 can receive motion from the input member 111 of the transmission assembly 106.

The transmission assembly 106 comprises a continuously variable transmission (CVT) 130 having a first adjustable pulley 131 receiving torque from the planet carrier 142 of a planetary further having a sun gear 140 connected with the input member 111. An endless flexible element 133 can transmit torque from the first pinion 131 to a second adjustable pinion 132 of the CVT 130, and the pinion 132 is connected with the rotary output member 134 of the transmission assembly 106. The output member 134 is normally driven by the pulley 132; however, it can transmit torque to the input member 111 when the motor vehicle is coasting.

The planetary further comprises at least one pinion 141 mating with the sun gear 140 and provided on the planet carrier 142, and an internal gear 143 which meshes with the pinion(s) 141 and can be held against rotation in response to the application of a stationary brake 144. For example, the brake 144 can be operated to permit or to prevent rotation of the internal gear 143 by means of a suitable actuator (not shown) through the medium of a setting member. The actuator can include an electric motor, a gearing driven by such motor, and a fluid-operated motion transmitting system (such as a master cylinder and a slave cylinder connected with the master cylinder by a conduit for a suitable fluid) between the gearing and the setting member. As will be described with reference to FIG. 3, the construction of the transmission assembly can depart from that of the assembly 106 without departing from the spirit of the invention. For example, the CVT can be installed upstream of the planetary, as seen in the direction of power flow from the input member 111 toward the output member 134.

The mode of operation of that part of the power train 100 which includes the prime mover 102, the clutches 103 and 105, the flywheel 104, and the at least one first auxiliary aggregate 112 is identical with or clearly analogous to that of the corresponding part of the power train 1 of FIG. 1. The brake 144 performs a shifting and starting operation corresponding to that of the clutch 8 in the power train 1.

An advantage of the power train 100 is that the construction of and the controls for the clutches 103, 105 are even simpler than those for the clutches 4 and 8. The brake 144 is stationary and its controls, too, can be surprisingly simple, compact and relatively inexpensive but reliable.

The at least one second auxiliary aggregate 120 receives motion from the input member 111 by way of a driving connection 121. The operation of the aggregate 120 is not dependent upon the condition of the clutch 103 and/or 105, i.e., it can receive torque, power or motion only from the input member 111 regardless of whether the latter receives torque from the flywheel 104 or from the output member 134 (during coasting of the motor vehicle).

The systems 103, 105 need not perform any functions other than those of relatively simple clutches; this also contributes to the simplicity and reliability of the power train 100. As already mentioned above, the steering and starting functions of the system 8 are taken over by the stationary brake 144.

Another important advantage of the power train 100 is that the auxiliary aggregates 112, 120 can be operated irrespective of whether or not the motor vehicle is in motion, as long as the flywheel 104 stores a sufficient amount of energy. At least the auxiliary aggregate 120 can be operated regardless of whether or not the prime mover 102 (such as an internal combustion engine) is on. This renders it possible to achieve considerable savings in fuel and a considerable reduction of combustion products.

The planetary including the components 140 to 143 can be replaced with another suitable gear train without departing from the spirit of the invention.

Furthermore, the brake 144 can be replaced with a clutch.

The auxiliary aggregate 14, 15, 112 and/or 120 can constitute any one of (a) a light generator, (b) at least a portion (e.g., a compressor) of an air conditioning unit, (c) at least one pump, (d) at least one portion (e.g., a pump) of a power steering mechanism, (e) at last one braking force amplifier, (f) at least a portion (such as a pump) of an antiblocking system (ABS), (g) at least one blower or fan, and/or (h) any other auxiliary device which must be connected to a torque generating device, to a motion transmitting device or any other suitable activating device and can be utilized with advantage in or in conjunction with the power train of a motor vehicle.

The torque transmitting system 4, 8, 103 and/or 105 can constitute an automated (such as actuator-operated) clutch.

It is further possible to replace the flywheel 6 and/or 104 with the armature of an electric motor.

The planetary including the parts 140 to 143 can be replaced with another suitable gear train, for example, a gear train known as an epicyclic gear system, and more specifically a so-called differential gearing with a rotary housing or case (in FIG. 2, the "housing" or "case" is the rotary internal gear 143 of the planetary). Reference may be had to pages 139–140 of a German-language technical encyclopaedia by Dubbel entitled "Taschenbuch für Mascbinenbau" (18th Edition, 1985).

The placing of the planetary (140–143) between the prime mover 102 and the CVT 130 exhibits numerous important advantages including the following:

(A) The internal gear 143 can be arrested or released by the simple expedient of operating the brake 144. Thus, the planetary can begin to transmit torque between the input member 111 and the pulley 131 of the CVT 130 as soon as the brake is actuated.

(B) The motor vehicle embodying the power train 100 can be started and its speed regulated in a very simple but predictable manner by resorting to a stationary brake 144 the mounting and the operation of which are much simpler than if the starting and/or the speed of the motor vehicle were to be regulated by a mobile constituent in lieu of the brake 144.

(C) The accessibility of the stationary brake 144 is highly satisfactory which simplifies the operation and the maintenance work upon the brake. Such design is particularly advantageous in power trains which employ components having parts which are to slip or slide relative to each other.

(D) The planetary (140 to 143 or its equivalent) can be used as a substitute for a conventional differential which receives torque from the output member of the transmission assembly and drives the axle(s) for the driven wheels. Thus, it is now possible to employ a simple and more compact and less expensive differential without the need for a bulkier and more complex transmission assembly.

Figure 3:
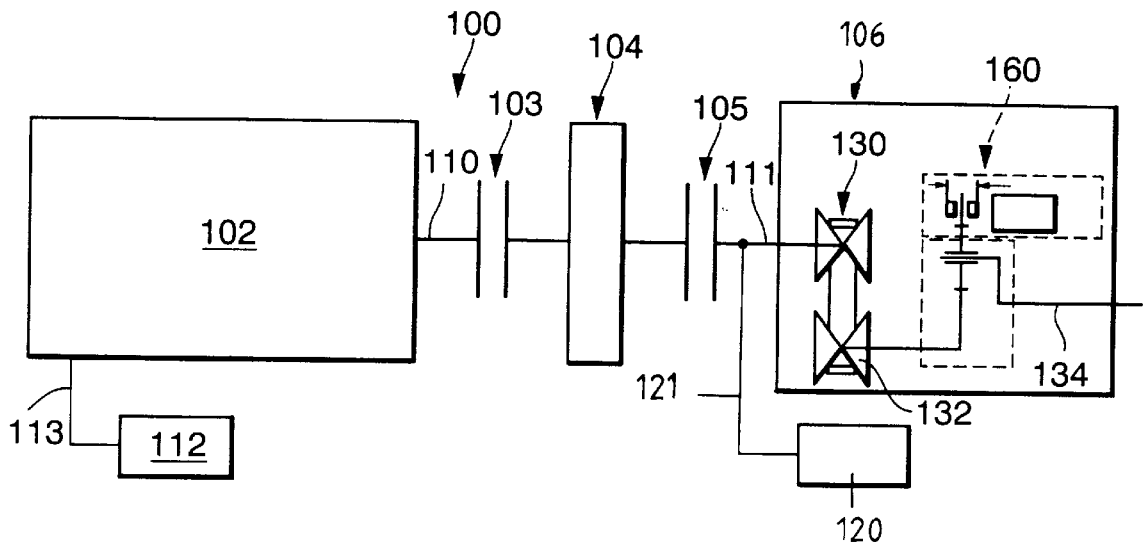
FIG. 3 is a similar view of a power train wherein the transmission assembly constitutes a modification of the transmission assembly in the power train of FIG. 2.

FIG. 3 shows a power train 100' having a transmission assembly 106' which constitutes a modification of the transmission assembly 106 shown in FIG. 2. The main difference is that the CVT 130 of FIG. 3 is installed upstream of the planetary 160, as seen in the direction of power flow from the input member 111 toward the output member 134. In other words, in lieu of being connected with the input member 111, the sun gear of the planetary 160 is connected with the second pinion 132 of the CVT 130.

An advantage of the power train 100' of FIG. 3 is that it is not necessary to provide a discrete prime mover for the auxiliary aggregate 120 when the prime mover 102 is off. The energy which is being transmitted from the output member 134 to the input member 111 of the transmission assembly 106' can be stored by the flywheel 104 by the simple expedient of engaging the clutch 105 of FIG. 3, and such stored energy can be utilized to operate the auxiliary aggregate 120 by way of the clutch 111 and driving connection 121.

Another advantage of the power train 100' is that its prime mover 102, too, can be arrested during certain stages of operation of the motor vehicle with attendant savings in fuel and a reduction of combustion products without adversely affecting the operation (such as actual intervals of use) of at least one (120) of the auxiliary aggregates.

It will be readily appreciated that at least some of the afore-enumerated advantages (A) to (D) of the power train 100 of FIG. 2 are also exhibited by the power train 100' of FIG. 3.

FIG. 4 shows a portion of a further power train which includes a prime mover 201 having a rotary output element 207 arranged to drive the sun gear 206 of a planetary 200. The latter further includes one or more planet pinions 208, a planet carrier 209, and an internal gear 211 having a friction generating portion 212 engageably by a brake 213 which is operable by a suitable actuator 214.

The planet carrier 209 can drive the input member 210 of a transmission assembly 202 having a rotary output member 203 operatively connected with a differential 205 for the axles of the driven wheels 204 of the motor vehicle having a power train which embodies the structure of FIG. 4.

The actuator 214 must be capable of inducing the brake 213 to furnish the braking torque $M_{Brems}$. This ensures that the brake 213 can cooperate with the friction generating portion 212 of the internal gear 211 of the planetary 200 to interrupt the power flow between the prime mover 201 and the transmission assembly 202.

It is also possible to install the planetary 200, the brake 213 and the actuator 214 in such a way that they can interrupt the power flow between an internal component of the transmission assembly 202 and the output member 203, or between the output member 203 and the differential 205.

It is also clear that the power train of FIG. 4 can also comprise two torque transmitting systems (corresponding, e.g., to the clutches 103, 105), at least one flywheel or armature (such as 104) or another suitable energy storing means, and one or more auxiliary aggregates (such as 112, 120).

The power train of FIG. 1, 2, 3 or 4 can be installed in passenger cars as well as in many other types of motor vehicles including trucks, vans as well as many others. Furthermore, the auxiliary aggregates which can be associated with and/or incorporated into the improved power train can include any of those which are specifically mentioned in this specification as well as certain other aggregates.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of power trains for use in motor vehicles and, therefore, such adaptations should and are intended to be comprehended within the meaning and range of equivalence of the appended claims.

What it claimed is:

1. A power train for use in a motor vehicle, comprising:
   a prime mover;
   energy storing torque transmitting means;
   a transmission assembly;
   an engageable and disengageable first torque transmitting system arranged to transmit torque between said prime mover and said energy storing means in the engaged condition thereof;
   an engageable and disengageable second torque transmitting system arranged to transmit torque between said energy storing means and said transmission assembly in the engaged condition thereof;
   at least one first drivable auxiliary aggregate;
   a first driving connection between said prime mover and said first auxiliary aggregate;
   at least one second drivable auxiliary aggregate;
   a second driving connection between said transmission assembly and said at least one second auxiliary aggregate; and wherein said second driving connection comprises a freewheel, and further comprising a third driving connection between said prime mover and said at least one second auxiliary aggregate.

2. The power train of claim 1, wherein said first driving connection is arranged to drive said at least one first auxiliary aggregate irrespective of the condition of said first torque transmitting system.

3. The power train of claim 2, wherein said second driving connection is arranged to drive said at least one second auxiliary aggregate irrespective of the condition of said second torque transmitting system.

4. The power train of claim 1, wherein said second driving connection is arranged to drive said at least one second auxiliary aggregate irrespective of the condition of said second torque transmitting system.

5. The power train of claim 1, wherein said transmission assembly comprises a starting unit including at least one of (a) a starting clutch, (b) a torque converter, (c) a starting brake, and (d) a forwards-rearwards shifter.

6. The power train of claim 1, wherein said transmission assembly comprises at least one gear train.

7. The power train of claim 6, wherein said at least one gear train includes a planetary.

8. The power train of claim 1, wherein said transmission assembly comprises rotary input and output members, and a planetary including a first component constituting a sun gear, a second component constituting a planet carrier, and a third component constituting an internal gear, one of said components being operatively connected with said input member, another of said components being operatively connected with said output member, and the remaining one of said components being arranged to be blocked by a device comprising one of (a) a cluch and (b) a brake.

9. The power train of claim 8, wherein said one component is said sun gear, said other component is said planet carrier, and said remaining component is said internal gear.

10. The power train of claim 8, wherein said planetary further comprises at least one pinion mating with said sun gear, provided on said planet carrier, and mating with said internal gear.

11. The power train of claim 8, wherein said assembly further comprises a continuously variable transmission connecting said other component with said output member.

12. The power train of claim 8, wherein said assembly further comprises a continuously variable transmission connecting said input member with said one component.

13. The power train of claim 1, wherein said third driving connection comprises an engageable and disengageable clutch.

14. The power train of claim 1, wherein said first driving connection is arranged to drive said at least one first auxiliary aggregate irrespective of the condition of said first torque transmitting system and said second driving connection is arranged to drive said at least one second auxiliary aggregate irrespective of the condition of said second torque transmitting system, said second driving connection comprising a freewheel and further comprising a third driving connection arranged to transmit torque between said prime mover and said at least one second auxiliary aggregate.

15. The power train of claim 14, wherein said third driving connection comprises an engageable and disengageable clutch.

16. The power train of claim 15, wherein said at least one second auxiliary aggregate is arranged to receive motion from said prime mover by way of said third driving connection in the engaged condition of said clutch, and to receive motion from said transmission assembly by way of said second driving connection in the disengaged condition of said clutch.

17. The power train of claim 1, wherein at least one of said auxiliary aggregates includes at least one of (a) a light generator, (b) at least a portion of an air conditioning unit, (c) at least one pump, (d) at least one portion of a power steering system, (e) at least one braking force amplifier, (f) at least a portion of an antiblocking system, and (g) at least one blower.

18. The power train of claim 17, wherein said portion of said air conditioning unit comprises a compressor.

19. The power train of claim 17, wherein said portion of said power steering system comprises a pump.

20. The power train of claim 18, wherein said portion of said antiblocking system comprises a pump.

21. The power train of claim 1, wherein at least one of said torque transmitting systems comprises a clutch.

22. The power train of claim 21, wherein said clutch is an automated clutch.

23. The power train of claim 1, wherein said energy storing means comprises at least one flywheel.

24. The power train of claim 1, wherein said energy storing means comprises an armature of an electric motor.

25. The power train of claim 1, wherein said prime mover comprises one of (a) a combustion engine, (b) an electric motor, and (c) a hybrid unit including a combustion engine and a motor.

* * * * *